Patented Sept. 20, 1949

2,482,104

UNITED STATES PATENT OFFICE 2,482,104

INHIBITED PHOSPHORIC ACID SOLUTION

Frank E. Dolian, United States Army

No Drawing. Application February 8, 1946,
Serial No. 646,480

1 Claim. (Cl. 23—165.)

(Granted under the act of March 3, 1883, as
amended April 30, 1928; 370 O. G. 757)

This invention relates to inhibitors for the corrosion of metals by acids and deals particularly with inhibitors for phosphoric acid solutions.

More particularly this invention includes a quinoline composition for aqueous phosphoric acid solutions to inhibit the corrosion of ferrous metals.

It is the object of this invention to prepare a composition which will inhibit the corrosion of metals by acids and to provide a process for preventing such corrosion.

Acids are used to a very great extent in manufacturing processes and the problem of the corrosion of metal equipment is always present. Iron and mild steel, which are relatively inexpensive cannot ordinarily be used where exposure to acids is required. It is therefore necessary to inhibit the corrosive action of the acids or to provide expensive acid-resistant apparatus.

Acids are also used in pickling solutions and inhibitors are required to prevent too violent an attack on the base metal.

In oil well cleaning, acids are effective, but the well casings will be seriously attacked unless an inhibitor is employed.

There is one very serious disadvantage to the use of acids such as $H_3PO_4$ from a manufacturing standpoint. Solutions of the acid attack iron or mild steel very strongly, as would be expected, the iron going into solution and hydrogen gas being liberated. A few laboratory corrosion tests indicated that the rate of corrosion of mild steel by a 25% $H_3PO_4$ solution is about 2.7 inches per year penetration. This high rate obviously precludes the use of ordinary steel equipment in processes employing phosphoric acid. It likewise indicates the necessity of finding a satisfactory inhibitor for this corrosion in order to make $H_3PO_4$ processes more practicable.

A search was started for a satisfactory inhibitor, most of the early work consisting of an evaluation of arsenic pentoxide ($As_2O_5$) which other investigators (Kosting & Heins, Ind. Eng. Chem. 23, 140 1931) had recommended as being the best inhibitor for $H_3PO_4$ attack of iron and steel. Arsenic pentoxide proved to be a very satisfactory inhibitor for short periods of exposure (up to about 48 hours), but conversely I have found it to be a very treacherous inhibitor for longer periods of exposure due to severe pitting which apparently started by the development of pin-holes in the arsenic protective film on the surface of the metal. These pinholes allowed acid to penetrate under the film and serious, localized, corrosion resulted even though there was no visible evidence of attack until a close examination was made of the metal after the test piece had been removed from the acid solution for cleaning and weighing at the end of the test. In one case, for example, the rate of corrosion with $As_2O_5$ inhibited solutions, when expressed as average penetration in inches per month, or as grams per sq. cm. per hour, was very low, but one deep pit had formed on the test piece which was $\frac{1}{16}''$ to $\frac{1}{8}''$ in depth.

$As_2O_5$ fails as an inhibitor because the protective film it forms on the surface of the metal apparently does not remain absolutely continuous for a very long time. Other types of compounds, i. e., organic nitrogen and sulfur compounds, also form films but of a different type, on steel; these might be classed, for the sake of differentiation, as physical or mechanical films, whereas the $As_2O_5$ probably forms a chemical film through reaction with iron. It was believed possible that if both types of inhibitors were present in $H_3PO_4$-solutions, the action of one might augment that of the other, i. e., the physical or mechanical films-forming compound might serve to repair pin-holes which develop in the $As_2O_5$ film. On the basis of this hypothesis, combinations of $As_2O_5$ with several organic nitrogen and sulfur compounds which showed appreciable inhibition when used alone, were tried as inhibitors in 25% aqueous $H_3PO_4$. The only one which showed great promise was a mixture of $As_2O_5$ and 4-methyl-2-hydroxy quinoline. The data of Table I show the results obtained with the inhibitor combination in comparison with those obtained with each compound alone and with no inhibitor.

TABLE I

*Corrosion of mild steel by 25% aqueous $H_3PO_4$ solutions at room temperature*

| Inhibitor | | Length of Test | Average Penetration | Condition of Test Piece at End of Test |
|---|---|---|---|---|
| Nature | Conc. | | | |
| | *Percent* | *days* | *in./mo.* | |
| None | | [1] 2 | 0.120 | Uniform attack; surface rough; size of piece visibly reduced. |
| $As_2O_5$ | 0.2 | [1] 43 | 0.00433 | Severe pitting on edges of test pieces; some pits 3/32" deep. |
| $As_2O_5$ | 0.4 | [1] 46 | 0.00118 | Severe pitting; one large pit 1/16" deep. |
| 4-methyl-2-hydroxy quinoline | 0.2 | [1] 22 | 0.00441 | Uniform attack; no pitting. |
| $As_2O_5$<br>4-methyl-2-hydroxy quinoline | 0.1<br>0.1 | 46 | 0.00072 | Slight discoloration of metal; no visible corrosion. |

[1] Test was stopped as soon as serious corrosion was noted.

Although the above description is limited to 4-methyl-2-hydroxy quinoline, the preferred inhibitor, and most effective in mixtures of arsenic pentoxide, other heterocyclic organic nitrogen compounds may be used. 4-methyl-2-hydroxy quinoline can be used alone or combined with arsenic pentoxide to produce an improved inhibitor which will prevent the corrosion of metals, particularly ferrous metals, by acids. Although phosphoric acid specifically is disclosed, my invention is applicable to inhibit corrosion of other acids.

While my invention has been described with particular reference to specific embodiments, it is to be understood that the above disclosure is to be considered broadly, and limited solely by the scope of the appended claim.

I claim:

A composition inhibited against corrosion of ferrous metals by phosphoric acid and consisting of a 25% aqueous $H_3PO_4$ solution containing .1% as $As_2O_5$ and .1% of 4-methyl-2-hydroxy quinoline.

FRANK E. DOLIAN.

REFERENCES CITED

The following references are of record in the file of this patent:

UNITED STATES PATENTS

| Number | Name | Date |
|---|---|---|
| 1,678,775 | Gravell | July 31, 1928 |
| 1,746,676 | Rhodes | Feb. 11, 1930 |
| 1,877,504 | Grebe et al. | Sept. 13, 1932 |